Inventor
Robert Adler
By Francis W. Crotty
Attorney

ACOUSTIC SURFACE WAVE FILTER DEVICES

Filed June 25, 1969

Inventor
Robert Adler
By Francis W. Crotty
Attorney

United States Patent Office 3,550,045

Patented Dec. 22, 1970

3,550,045

ACOUSTIC SURFACE WAVE FILTER DEVICES

Robert Adler, Northfield, Ill., assignor to Zenith Radio Corporation, Chicago, Ill., a corporation of Delaware Filed June 25, 1969, Ser. No. 836,551

Int. Cl. H03h 7/30

U.S. Cl. 333—72 18 Claims

ABSTRACT OF THE DISCLOSURE

Interleaved-comb-type surface-wave electromechanical transducers are spaced apart on the surface of a propagating medium. Such transducers have a frequency response characteristic that exhibits a main lobe of maximum response at a design center frequency with smaller lobes between nulls at successive lower and higher frequencies. In order to broaden the response of a transducing system between the first nulls on either side of the design frequency, the output transducing unit is segmented into a laterally spaced pair of individually transducers that are mutually unequal in frequency of maximum response and in spacing from the input transducing unit. The two output transducers are interconnected in series combination and a load is coupled across that series combination. The individual responses of the two output transducers combine to yield an overall response that is reasonably flat over a broader frequency range.

To further broaden the response of the entire device, the input transducing unit is segmented into three individual transducers spaced apart laterally. The outer two transducers are spaced from the output transducing unit a distance that is unequal to the spacing between that unit and the inner input transducer. Moreover, the two outer transducers are intercoupled in parallel combination and that combination, in turn, is intercoupled in series with the inner one of the transducers. An input signal source is coupled across the overall combination of all three transducers.

BACKGROUND OF THE INVENTION

The present invention pertains to SWIF's, an abbreviation for surface-wave integratable filters. More particularly, it relates to SWIF's that exhibit particularly ascertainable frequency-selectivity characteristics.

In copending application Ser. No. 721,038, filed Apr. 12, 1968, a variety of SWIF systems and devices are disclosed. Particularly for use in television receivers as frequency-selective elements, a plurality of SWIF's, arranged effectively in cascade in a signal channel, have their individual frequency-selectively characteristics tailored so that together they define a desired overall frequency response curve for the signal channel in which they are used. The selectivity of each channel is adjusted by means of such variables as the size, shape and spacings involved in the transducers in each SWIF. However, the passband of useful response of each individual transducer is limited by its own characteristics.

It is a general object of the present invention to provide a new and improved SWIF in which the passband is increased in width.

Another object of the present invention is to provide a new and improved SWIF affording additional flexibility with respect to the frequency-selectively characteristics.

Still another object of the present invention is to provide a SWIF in which the ratio between the useful bandwidth in the passband and the frequency separation between the nulls adjacent to the design center frequency is increased.

A further object of the present invention is to provide a SWIF of the foregoing character which is fully compatible with integrated-circuit fabrication.

SUMMARY OF THE INVENTION

In accordance with one embodiment of the present invention, a SWIF includes an acoustic surface-wave-propagating medium, an input transducing system on that medium responsive to input signals for launching acoustic surface waves and an output transducing system on the medium responsive to those waves for developing an output signal. The output transducing system is segmented into a pair of laterally spaced transducers having mutually unequal frequencies of maximum response and unequal spacings from the input transducing system. A load is coupled across the transducer segments. The input transducing system is segmented into three transducers laterally spaced across the wave propagation path with the outer two transducers spaced equally from the output transducing system a selected distance and the inner transducer spaced therefrom by a different distance. An input signal source is coupled across this transducer combination. Other features of the invention include a reversal in function of these two transducing ssytems, the use of either one in combination with a different transducer system at the other end of the device and the attainment of a specific relationship of phase delay between a pair of co-acting transducers and the duration of a single image element of a television signal.

DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

In FIG. 1, a signal source 10 is connected across an input transducing system 11 mechanically coupled to one major surface of a body of piezoelectric material in the form of a substrate 12 that is capable of propagating acoustic surface waves. An output or second portion of the same surface of substrate 12, is, in turn, mechanically coupled to an output transducing system 13 that is composed of a pair of individual electromechanical output transducers 14 and 15 interconnected in series and across which series combination a load 16 is connected. Transducers 11, 14 and 15, in the simplest arrangement, are each constructed of a pair of comb-type electrode arrays. The strips or conductive elements of one comb are interleaved with the strips of the other in each pair. The electrodes are of a material such as gold or aluminum, which may be vacuum deposited on a smoothly lapped and polished planar surface of the piezoelectric body. The piezoelectric material, such as PZT or quartz, is propagative of acoustic waves. The distance between the centers of the two consecutive strips in each array is one-half of the acoustic wavelength of a signal for which it is desired to achieve maximum response in that array.

Figure 1:
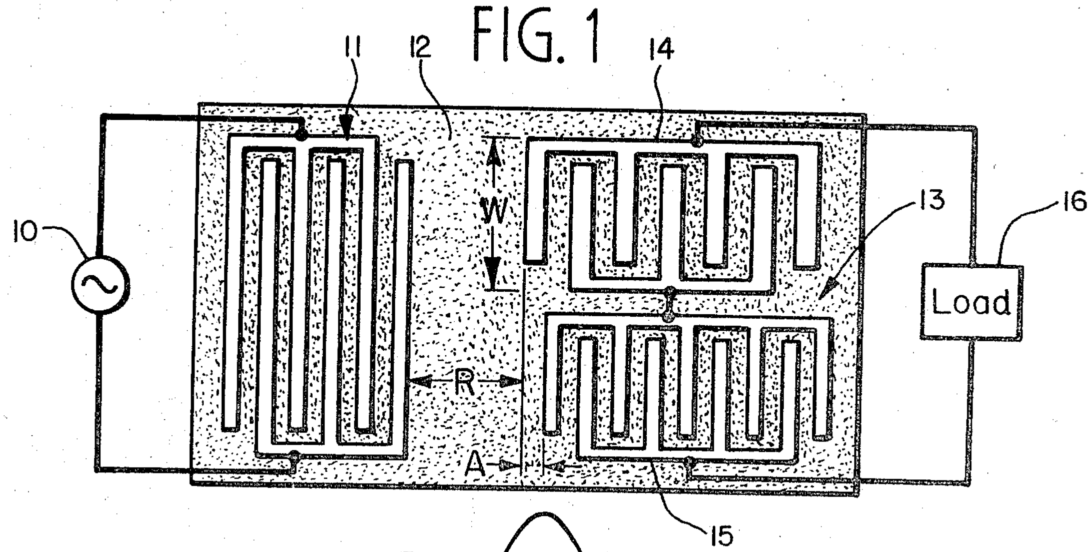
FIG. 1 is a schematic diagram of one embodiment of a SWIF system.

Direct piezoelectric surface-wave transduction is accomplished by the spatially periodic interdigital electrodes or teeth of transducer 11. A periodic electric field is produced when a signal from source 10 is fed to the electrodes and, through piezoelectric coupling, the electric signal is transduced to a traveling acoustic surface wave on substrate 12. This occurs when the strain components produced by the electric field in the piezoelectric substrate are substantially matched to the strain components associated with the surface-wave mode. Source 10, for example the tuner of a television receiver, produces a range of signal frequencies, but due to the selective nature of the arrangement only a particular frequency and its intelligence-carrying sidebands are converted to surface waves. The SWIF may thus function as an intermediate-frequency filter for the receiver. Load 16, in this environment, then comprises those stages of the receiver subsequent to the intermediate-frequency stage that respond to the program signal in producing a television image and its associated audio program. The surface waves resulting in substrate 12, in response to the energization of transducer 11 by the tuner output signal, are transmitted along the substrate to output transducers 14 and 15 where they are converted to respective electrical output signals that are superimposed in load 16.

In a typical television IF embodiment, utilizing PZT as the piezoelectric substrate, the strips of input transducer 11 are approximately 0.5 mil wide and are separated by about 0.5 mil for the application of an IF signal in the typical range of 40–46 megahertz. The strips of output transducers 14 and 15 are similarly dimensioned except, as will be further discussed, for a purposeful mutual difference of center-to-center strip separation. The spacing between input transducer 11 and output transducers 14 and 15 is on the order of 60 mils and the width of the wavefront launched by input transducer 11 is approximately 120 mils. The structure of transducer 11 and either one of output transducers 14 and 15, together with the effect of substrate 12, can be roughly compared to a cascade of two tuned circuits with a resonant frequency of approximately 40 megahertz, the resonant frequency being determined, at least to a first order, by the spacing of the strips.

The potential applied to any given pair of successive strips in electrode array 11 produces two waves traveling along the surface of substrate 12, in opposing directions perpendicular to the strips for the illustrative isotropic case of a ceramic substrate poled perpendicularly to the surface. When the distance between the strips is one-half of the acoustic wavelength of the wave at the desired input frequency, or is an odd multiple thereof, relative maxima of the output signal are produced by piezoelectric transduction in either one of output transducers 14 and 15. For increased selectivity, that is, a narrowing of the frequency response characteristic, additional electrode strips are added to one or more of the comb patterns of the transducers 11, 14 and 15. Further modifications and adjustments are described in aforementioned copending application Ser. No. 721,038, for the purpose of particularly shaping the response presented by the filter to the transmitted signal, as in each case viewed across the respective individual ones of output transducers 14 and 15.

Figure 2:
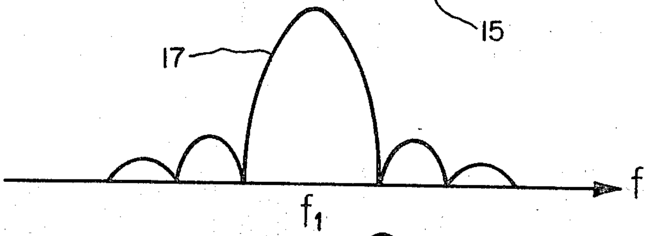
FIGS. 2, 3 and 4 are plots of frequency-response characteristics of the system of FIG. 1.

For present purposes, it is assumed that the electrode spacings and the total number of electrodes in output transducer 14 have been selected so that, as would be viewed if load 16 were connected just across transducer 14, the frequency response presented by that transducer is as depicted in FIG. 2. That response exhibits a major lobe 17 centered about a frequency $f_1$ and symmetrically spaced between much smaller lobes and an alternating succession of nulls or minimums spaced, in terms of frequency, outwardly in both directions from the center frequency $f_1$. To achieve that response, the spacings between successive strips in the electrode array of transducer 14 are equal to one-half of an acoustic surface wavelength at that center frequency $f_1$ and the strips are of equal length. As indicated above, the frequency selectivity may be sharpened, that is, the null points may be moved closer to $f_1$, by increasing the number of individual electrodes in transducer 14. Conversely, a decrease in the total number of individual transducer electrodes results in a broadening of major response lobe 17 and a corresponding movement of its null points further away from frequency $f_1$.

Figure 3:
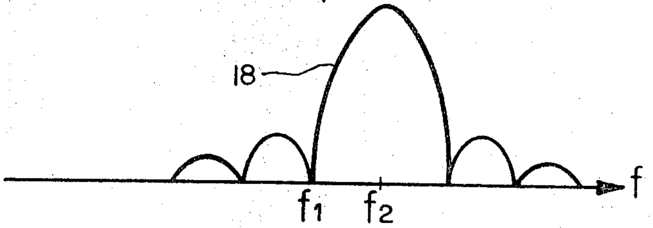

FIG. 3 depicts the frequency response curve of output transducer 15 as viewed individually with respect to that transducer. The overall shape of the curve in this case is essentially the same as that in the case of the other output transducer, and it includes a major lobe 18. In this case, however, the individual electrode spacing in transducer 15 is selected so that it exhibits a frequency of maximum response at a different and higher frequency $f_2$. Moreover, in this particular case frequencies $f_1$ and $f_2$ are each so related to the positions of the first nulls of the respective other curve that the frequency of maximum response of lobe 17 for transducer 14 coincides with the first null at the low-frequency side of major lobe 18 for transducer 15 and, similarly, the point of maximum response of lobe 18 corresponds to the first null on the higher-frequency side of lobe 17.

The achievement of these relationships between maximums and minimums is best explained by means of simple mathematical expressions that, in turn, reveal interesting further characteristics. The frequency response of a SWIF transducer can be approximated by the relationship sin $q/q$, where $$q=\frac{\Delta f}{fo}N\frac{\pi}{2} \tag{1}$$

and $\Delta f$ is the frequency difference from the maximum response frequency $fo$ and N is the number of strips in the transducer.

The condition that the first higher-frequency minimum of transducer 14 falls at the frequency of maximum response of transducer 15 is expressed:

$$f_2-f_2=\frac{2f_1}{N_1} \tag{2}$$

where $N_1$ is the number of strips in transducer 14.

Similarly, the condition that the first lower-frequency minimum of transducer 15 falls at the frequency of maximum response of transducer 14 is expressed:

$$f_2-f_2=\frac{2f_2}{N_2} \tag{3}$$

where $N_2$ is the number of strips in transducer 15.

Therefore, $$\frac{f_1}{N_1}=\frac{f_2}{N_2} \tag{4}$$

Furthermore, $$V_s=2f_1S_1=2f_2S_2 \tag{5}$$

where $V_s$ is the surface wave velocity and $S_1$ and $S_2$ are the respective tooth-to-tooth distances in transducers 14 and 15.

Substituting Equation 5 into Equation 4 gives the relationship:

$$N_1S_1=N_2S_2 \tag{6}$$

$N_1S_1$ is very close to the total length of transducer 14, and the same holds for $N_2S_2$. Therefore, the lengths of transducers 14 and 15 are the same. Moreover, by causing the maximum response frequency of transducer 14 to coincide with the first lower-frequency minimum of transducer 15 the first lower-frequency minimum of transducer 14 coincides with the second lower-frequency minimum of transducer 15, and this desired result is automatically obtained. That is, with the transducers connected in series, there is a zero in total response at this last-mentioned frequency. Similarly, satisfaction of Equation 4 assures that most of the individual frequencies of zero response of each transducer stay preserved in the combined output response.

Equation 2 can be rewritten in the form:

$$f_2=f_1\left(1+\frac{2}{N_1}\right) \quad (7)$$

Substituting Equation 7 in Equation 3 gives:

$$\frac{2}{N_1}=\frac{2}{N_2}\left(1+\frac{2}{N_1}\right) \quad (8)$$

Simplified, this gives:

$$2N_2=2N_1+4 \quad (9)$$

or $$N_2-N_1=2 \quad (10)$$

Therefore, the condition that the first higher minimum of transducer 14 coincides with the frequency of maximum response of transducer 15 always requires that transducer 15 have two more strips than transducer 14. That is, the higher-frequency transducer has two more strips than the other.

Figure 4:
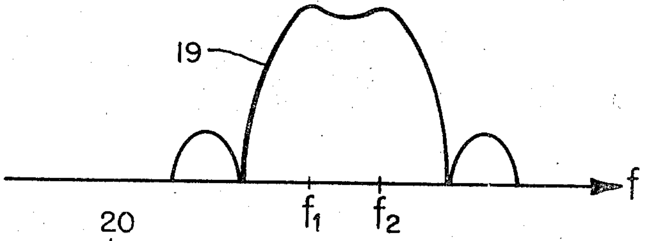

In addition to specific assignment of the respective maximum response frequencies of and numbers of strips in output transducers 14 and 15, those two transducers are unequally spaced by a distance A from input transducer 11. This distance is chosen to introduce a particular phase shift in the output signal individually developed by one of the output transducers as compared with that developed by the other. That is, because the surface waves travel a longer distance by the amount A in reaching output transducer 15, those surface waves and the resulting output signals they develop are delayed in phase relative to the portion of the surface waves interacting with transducer 14. In the case depicted, that amount of mutual phase difference is 90°, corresponding to a phase delay of one-fourth acoustic wavelength as represented by the distance A. With this arrangement, the overall frequency response curve, as seen across the two output transducers in series combination under an open-circuit condition, is as depicted in FIG. 4; the individual responses of FIGS. 2 and 3 are added in phase quadrature. Because the individual output signals are staggered and added in phase quadrature, the overall response is much broader and exhibits a substantial response over a larger portion of the frequency separation between the first nulls on either side of center than either output transducer considered alone. Thus, FIG. 4 features a major lobe 19 exhibiting a much broader passband including a reasonably flat top as is typical of the frequency response characteristics desired in the intermediate-frequency channels of television receivers. Moreover, by tailoring the shapes of the individual curves of the respective output transducers, the precise positions of the nulls immediately to either side of lobe 19 may be accurately located at specifically desired frequencies, for example at the respective frequencies of the associated sound carrier and the adjacent-channel picture carrier in the television-receiver environment.

Instead of utilizing a distance A of one-fourth wavelength, odd integral multiples of one-fourth wavelength, or 90°, may be employed. In general, similar results can be obtained by choosing for the phase shift between transducers 14 and 15 the quantity $(2n+1)$ 90°, where $n$ is a positive or negative integer. However, for use in a television-receiver intermediate-frequency channel, the delay between the respective two output signals must be less than one image or picture element; this corresponds to a value of approximately 0.1 microsecond. That time interval allows the use of up to the fifteenth multiple of a 90° phase shift.

Additional flexibility in design is obtained by utilizing a phase angle, represented by the distance A, of a value different from 90° or the aforementioned multiples thereof. For example, a phase shift of 180° produces a null in the middle of the passband. Computations of the response curves obtained with changes in the distance A reveal a family of related responses. Accordingly, variation of the distance A constitutes an additional tool or parameter available for obtaining a particularly desired response.

Figure 6:
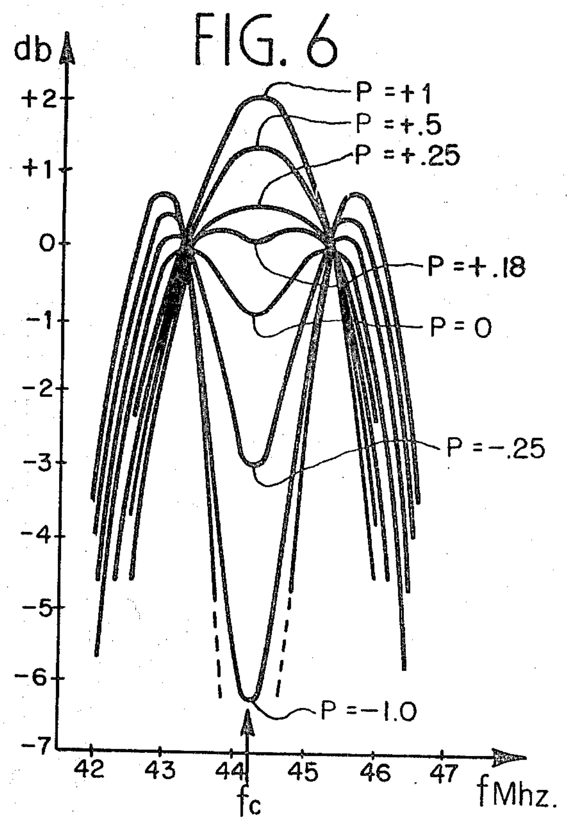
FIGS. 6, 7 and 8 show frequency-response curves of SWIF's of the present invention operated under a variety of different conditions.

For the first-described situation in which a phase angle of 90° is employed, the precise phase does not change appreciably over the comparatively narrow-frequency passband illustrated. It is for this reason that the overall response curve depicted in FIG. 4 is symmetrical. Such symmetry generally is maintained even though the phase shift departs from 90°, and a controlled amount of departure is useful for the purpose of maximizing or otherwise selecting the degree of "flatness" of the overall response curve. FIG. 6 depicts a family of curves calculated for varying amounts of phase shift in accordance with the relationship:

$$\phi_2-\phi_1=(P-1)\pi/2 \quad (11)$$

where $\varphi_2-\phi_1$ is the difference in mutual output-transducer phase corresponding to the distance A and P is the computational variable. The individual maximum response frequencies of transducers 14 and 15 are 43.26 mHz. and 45.27 mHz., respectively. The curves are calculated for phase angles determined at the center frequency $f_c$ of the overall or combined response; that is:

$$f_c=\frac{f_1+f_2}{2} \quad (12)$$

At one extreme, the curve for $P=-1.0$ illustrates the abovementioned null in the center of the passband for a phase shift of 180° between the two transducers. On the other hand, the curve for $P=+1$ represents the condition of 0° phase shift in which case there is mid-band peaking. All of the curves reveal steep skirt selectivity with pronounced nulls at each side of the aprpoximately 4 mHz. or ten percent passband. For maximum flatness of the response, a value for P of +0.18 is indicated; this corresponds to a phase shift of about 74°.

Figure 7:
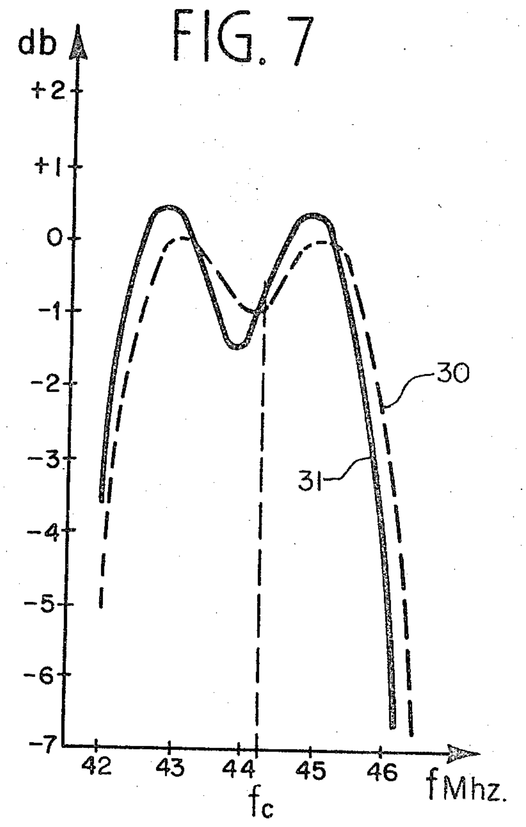

In contrast, when a high integral multiple of the 90° phase shift is employed, in the form of greatly increased (or decreased) values of the distance A (corresponding to shifts of pattern 15 to the right or to the left), it is found that the phase difference of the signals induced in transducers 14 and 15 vary more rapidly as a function of frequency. In FIG. 1, where pattern 15 is to the right of pattern 14, the phase difference decreases below the center frequency and increases above the center frequency. This renders the overall response asymmetrical and is, therefore, an additionally available technique when that particular characteristic is desired. FIG. 7 illustrates calculated curves for higher-multiple phase shifts (distance A) between the output patterns of the output transducers. Curve 30 represents a phase shift of 270°. Showing the greater asymmetry, curve 31 represents a phase shift five times larger.

Figure 8:
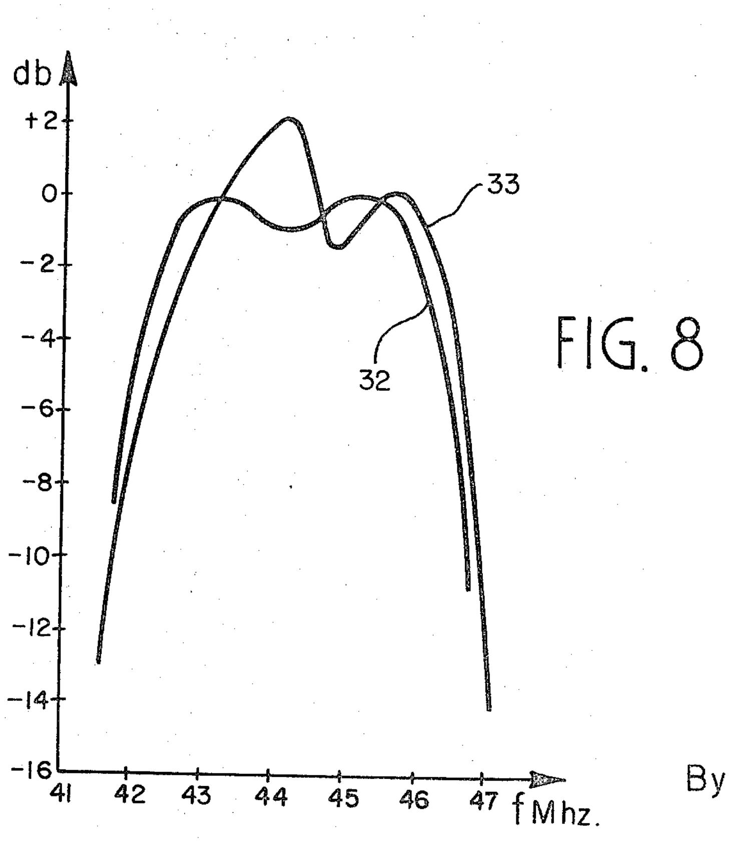

Tests upon actual devices confirm the operational principles illustrated by FIGS. 6 and 7. In any given environment, however, measurements may result in departures from calculated values. These may arise because of perturbations in the wave-propagating surface, imperfections in the transducer patterns, surface-wave reflections and other effects. FIG. 8 illustrates the nature of the difference which may result. Curves 32 and 33 respectively depict the calculated and measured responses for a SWIF in which output transducers 14 and 15 are separated by a distance A corresponding to a phase shift of 270°. While the feature of significantly broader response is clearly demonstrated, a departure from optimum flatness also is encountered.

Other parameters also affect the actual performance of the SWIF. One important consideration is the impedance presented by each individual output transducer. When an individual output transducer is of a width to intercept the entire wavefront of a surface wave launched by the input transducer, the signal potential induced in the output transducer is, to a first approximation, independent of the number of strips in that output transducer; hence, variation in selectivity can be obtained without substantial change in peak amplitude. However, the impedance level of the transducer is decreased as the number of strips is increased.

When the output transducer width W is less than that which would permit interception of the entire oncoming wavefront, its impedance also is a function of that width. Increasing width W decreases the impedance presented by the transducer. Of course, power transfer is related to the impedances of the output transducers and the load for optimum power transfer, it usually is preferred to have output transducers 14 and 15 present equal impedances. When the number of strips is about the same (e.g., differing by two), their preferred widths W, therefore, are approximately the same.

In presenting the overall curve of FIG. 4, it was assumed that the individual output signal potentials, corresponding to the responses shown in FIGS. 2 and 3, were combined by simple addition. That condition obtains only when the impedance of load 16 is high compared to the individual impedances of transducers 14 and 15. When such is not the case, the contribution of one output transducer may outweigh that of the other. the respective contributions being dependent upon the individual transducer impedances and the load impedance. In this situation, the attainment of optimum response can require that the individual widths of the output transducers be unequal in order to modify their relative impedances.

It has been noted in prior applications of the same assignee that a device like that in FIG. 1 suffers a three db loss, because waves launched to the left of input transducer 11 are not utilized. This can be obviated by making each of output transducers 14 and 15 of a width the same as that of input transducers 11 and locating one of the output transducers on the other side of the input transducer. Of course, the spacing difference A is maintained. Alternatively, another pair of output transducers like transducers 14 and 15, is disposed to the left of transducer 11; load 16 is then coupled across both output pairs either in series or parallel combination.

Figure 5:
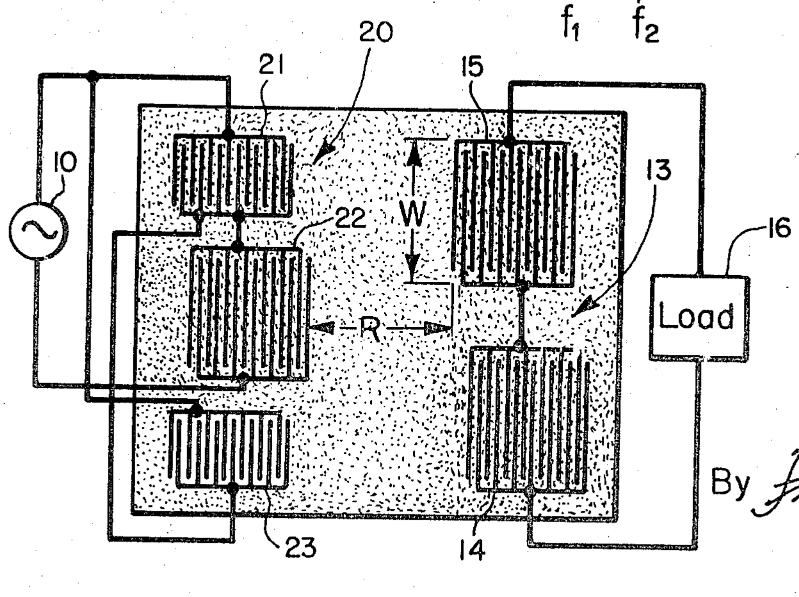
FIG. 5 is a schematic diagram of a related embodiment of a SWIF system.

The foregoing analysis has assumed interaction of output transducers 14 and 15 with uniform wavefronts in the approaching surface waves. In practice, that assumption is realized when input transducer 11 is of the simple type illustrated and the distance R, generally between the input transducer and the output transducers, is not excessively greater than the width W of the individual output transducers. However, the simple input transducer 11 of FIG. 1 is limited as to the total number of individual electrodes or strips it may employ, and thus as to total amplitude of the surface wave it launches, by the necessity that it exhibit a frequency response with a bandpass at least as wide as that desired for signal transmission in accordance with the overall response of FIG. 4. That is, the total response of the SWIF is given by the product of the responses of the input and output transducing units. FIG. 5 illustrates an approach which permits also broadening the bandpass of the input transducer while assuring that the desired response of output transducer 13 is preserved. In this embodiment, output transducing unit 13, its individual transducers 14 and 15 and the interconnection with load 16 are the same as described above with respect to FIG. 1.

Input transducing unit 20 is now segmented into three individual electromechanical input transducers 21, 22 and 23. The outer pair of input transducers 21 and 23 are spaced a given distance from output transducing unit 13 while the central or inner input transducer 22 is spaced from the output transducing unit by a different distance. The difference between these two spacings produces an effect analogous to that which results from the spacing A in FIG. 1. Also somewhat analogously, outer transducers 21 and 23 are identically tuned to exhibit maximum response at a first frequency, such as $f_1$ in FIG. 2, while inner input transducer 22 is tuned to exhibit maximum response at a different frequency such as $f_2$ in FIG. 3. Finally, the outer pair of transducers 21 and 23 are interconnected in parallel and input source 10 is connected across the series combination of that parallel combination and inner transducer 22.

In operation, the individual input-transducer frequency responses combine to produce a particular overall frequency response of the input transducing unit in the same way as has been discussed in connection with FIGS. 2–4 with respect to the output transducing unit. Accordingly, both the input and output sections of the SWIF of FIG. 5 may be arranged to exhibit identical frequency responses. Alternatively, one of those frequency responses purposely may be made different from the other in order to obtain some particularly desired shape of the ultimate overall selectivity in the entire signal transmission path that is provided between source 10 and load 16. In order to avoid inefficiency that otherwise may arise by reason of spread of the effective beams of acoustic waves launched by the input transducer, it is preferred again that the spacing R be of the same order as the width W of the individual output transducers.

The techniques described and illustrated enable the attainment with a single SWIF of a wide variety of selectivity characteristics. Of particular note is the capability of obtaining a wide, reasonably flat passband with good skirt selectivity and preservation of null frequencies. Moreover, the several different design parameters are readily varied in the course of design and fabrication so as to permit precise determination of such functions as bandwidth, maximum response frequency and null frequencies. At the same time, the SWIF's retain their character of permitting comparatively simple fabrication by the use of manufacturing techniques of a conventional nature utilized for the production of integrated circuits. The specific description has exemplified one arrangement of a segmented transducing unit for the output section and another for the input section. Either arrangement may be used alone, and, alternatively, either may be used in an input or an output section.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:

1. In apparatus interposed between a source of signals and a load, and including an acoustic surface-wave propagating medium, an input transducing system on said medium responsive to said signals for launching acoustic surface waves along said medium and an output transducing system on said medium responsive to said waves for developing an output signal, the improvement in which:

one of said transducing systems comprises a pair of transducers spaced laterally with respect to the path of propagation of said waves with the electrode elements of such relative dimension that said pair have individually different frequencies of maximum response to said signals and with the relative spacings of said pair from the other transducing system unequal by a predetermined amount;

and in which means are provided for coupling said source or said load across said pair of transducers electrically in series combination.

2. Apparatus as defined in claim 1 in which said amount is equivalent to one-foutrh wavelength of said acoustic surface wave.

3. Apparatus as defined in claim 1 in which said amount is selected to effect a substantial flatness to the peak portion of the frequency response characteristic of said apparatus.

4. Apparatus as defined in claim 3 in which said amount introduces a relative phase delay of signals translated by said pair of transducers of approximately seventy-four electrical degrees.

5. Apparatus as defined in claim 1 in which the frequency response of one of said pair of transducers exhibits a null at a predetermined frequency and in which the frequency response of the other transducer of said pair exhibits a maximum at said predetermined frequency.

6. Apparatus as defined in claim 1 in which said signal is an intermediate-frequency composite television signal having an image element duration of a predetemrined length, and said amount is an integral multiple of a value less than said one-half wavelength corresponding to a phase delay, between output signal portions appearing individually across said transducers, of less than said image element duration.

7. Apparatus as defined in claim 1 in which each of said pair of transducers is composed of interleaved pairs of electrode combs having a number of individual electrode elements each spaced apart by a given distance, and in which the product of said number and said distance is at least substantially the same for both transducers of said pair.

8. Apparatus as defined in claim 1 in which said transducers are composed of interleaved pairs of electrode combs with one of said transducers having two more electrode elements than the other.

9. Apparatus as defined in claim 1 in which the spacing between said input and output transducing systems is of the same order as the width of each one of said transducers in a direction lateral to said path.

10. Apparatus as defined in claim 1 in which the width of each of said pair of transducers, in a direction lateral to said path, is the same.

11. Apparatus as defined in claim 1 in which the other of said transducing systems is segmented into three transducers spaced laterally with respect to the path of surface wave propagation with the outer two of said three transducers spaced equally from said one transducing system by a selected distance and with the inner one of said three transducers spaced from said one transducing system by a given distance different from said selected distance.

12. Apparatus as defined in claim 11 in which said selected and said given distances differ effectively by one-fourth wavelength of said acoustic surface wave.

13. Apparatus as defined in claim 11 in which said outer transducers are intercoupled in parallel combination, in which said parallel combination is intercoupled in series combination with said inner transducer and in which either said source or said load is coupled across said series combination.

14. Apparatus as defined in claim 11 in which the spacing between said input and output transducing systems is of the same order as the width of each of said individual transducers in a direction lateral to said path.

15. In apparatus interposed between a source of signals and a load, and including an acoustic surface-wave propagating medium, an input transducing system on said medium responsive to said signals for launching acoustic surface waves along said medium, and an output transducing system on said medium responsive to said waves for developing an output signal, the improvement in which:

one of said transducing systems is segmented into three transducers spaced laterally across said path with the outer two of said three transducers spaced equally from the other transducing system by a selected distance and with the inner one of said three transducers spaced from said other transducing system by a given distance different from said selected distance.

16. Apparatus as defined in claim 15 in which said selected and given distances differ effectively by one-fourth wavelength of said acoustic surface wave.

17. Apparatus as defined in claim 15 in which said outer transducers are intercoupled in parallel combination, in which said parallel combination is intercoupled in series combination with said inner transducer, and in which said source or said load is coupled across said series combination.

18. Apparatus as defined in claim 15 in which said outer transducers exhibit a maximum response at a first frequency and said inner transducer exhibits a maximum response at a second and different frequency.

References Cited

UNITED STATES PATENTS

| | | | |
|---|---|---|---|
| 2,886,787 | 5/1959 | Broadhead et al. | 333—72 |
| 3,334,307 | 8/1967 | Blum | 333—72X |
| 3,360,749 | 12/1967 | Sittig | 333—72X |
| 3,376,572 | 4/1968 | Mayo | 333—72X |
| 3,401,360 | 9/1968 | Schulz-Du Bois | 333—30 |
| 3,479,572 | 11/1969 | Pokornoy | 333—30X |

HERMAN KARL SAALBACH, Primary Examiner

T. VEZEAU, Assistant Examiner

U.S. Cl. X.R.

333—30